(12) United States Patent
Song et al.

(10) Patent No.: US 8,950,762 B2
(45) Date of Patent: Feb. 10, 2015

(54) ARM-WHEEL TYPE ROBOTIC VEHICLE COMPRISING SUSPENSION SYSTEM

(75) Inventors: Ji-hyuk Song, Changwon (KR); Rickey Newmayer, Cerritos, CA (US); Jong-yoon Peck, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 590 days.

(21) Appl. No.: 12/954,380

(22) Filed: Nov. 24, 2010

(65) Prior Publication Data

US 2011/0127745 A1 Jun. 2, 2011

Related U.S. Application Data

(60) Provisional application No. 61/264,721, filed on Nov. 27, 2009.

(30) Foreign Application Priority Data

Dec. 23, 2009 (KR) .................. 10-2009-0130039

(51) Int. Cl.
*B60G 9/00* (2006.01)
*B60G 17/02* (2006.01)
*B60G 3/14* (2006.01)

(52) U.S. Cl.
CPC .......... *B60G 3/145* (2013.01); *B60G 2200/132* (2013.01); *B60G 2204/124* (2013.01); *B60G 2204/129* (2013.01); *B60G 2204/143* (2013.01); *B60G 2300/07* (2013.01); *B60G 2300/38* (2013.01)
USPC .............. 280/124.1; 280/124.128; 280/5.515; 280/5.2; 280/6.155; 280/6.156; 180/24.02; 180/8.1

(58) Field of Classification Search
CPC ............ B60G 3/145; B60G 2200/132; B60G 2204/124; B60G 2300/38; B60G 2204/143; B60G 2300/07; B60G 2204/129
USPC ......... 280/124.1, 124.101, 124.128, 124.129, 280/5.515, 5.2, 6.15, 6.155, 6.156, 755; 180/22, 24.02, 24.03, 21, 8.1, 8.2, 8.3; 188/302–306; 267/223–225; 901/1
See application file for complete search history.

(56) References Cited

U.S. PATENT DOCUMENTS

| | | | | |
|---|---|---|---|---|
| 1,105,971 A | * | 8/1914 | Fox ............................... | 267/218 |
| 3,351,037 A | * | 11/1967 | Meili ......................... | 440/12.66 |
| 4,119,170 A | * | 10/1978 | Hutcherson ................... | 180/448 |
| 4,315,631 A | * | 2/1982 | Rainville .................... | 280/5.504 |
| 4,595,069 A | * | 6/1986 | Oswald et al. ............. | 180/24.02 |
| 4,600,069 A | * | 7/1986 | Oswald et al. ............. | 180/24.02 |
| 4,861,065 A | * | 8/1989 | Cote ......................... | 280/6.154 |
| 6,112,843 A | * | 9/2000 | Wilcox et al. ................. | 180/345 |
| 6,267,196 B1 | * | 7/2001 | Wilcox et al. ................. | 180/347 |
| 6,799,649 B2 | * | 10/2004 | Kamen et al. .................. | 180/8.2 |
| 7,392,978 B2 | * | 7/2008 | Carlitz et al. ................. | 267/221 |

* cited by examiner

*Primary Examiner* — Ruth Ilan
*Assistant Examiner* — Joselynn Y Sliteris
(74) *Attorney, Agent, or Firm* — Sughrue Mion, PLLC

(57) ABSTRACT

A vehicle and a suspension system, for stabilizing vehicle disposition by lowering the center of gravity, and improving stability control performance are provided. The vehicle includes a body, at least one arm, a bottom unit, which may be a wheel, coupled to one end of an arm of the at least one arm, and a suspension system having a spring disposed to generate a counter moment in a direction that offsets an impact moment applied to the arm that is subjected to an impact.

9 Claims, 7 Drawing Sheets

ARM-WHEEL TYPE ROBOTIC VEHICLE COMPRISING SUSPENSION SYSTEM

CROSS-REFERENCE TO RELATED APPLICATIONS

This application claims priority from U.S. Provisional Application No. 61/264,721, filed on Nov. 27, 2009, and Korean Patent Application No. 10-2009-0130039, filed on Dec. 23, 2009, the disclosures of which are incorporated herein in their entirety by reference.

BACKGROUND

1. Field

Apparatuses consistent with exemplary embodiments relate to a suspension system and a vehicle including the same, and more particularly, to a suspension system and an arm-wheel type robotic vehicle including the same to absorb impacts applied to arm-wheels and control vehicle stability.

2. Description of the Related Art

Typically, industrial robots were designed to perform only designated tasks within a separate segregated workspace due to the possibility of accidents occurring. Recently, however, there are requirements for intelligent robots, which include human-interactive robots, health and welfare robots, office robots, protection robots, construction robots, nuclear robots, educational and game robots, military robots, and space exploration robots, based on data communications. Intelligent robots, which are service robots capable of autonomous movement, require a locomotive or ambulatory function in order to autonomously move to areas where they are needed to perform tasks.

In particular, disaster control robots, military robots, space exploration robots, and other robots that must be mobile and perform tasks in dangerous areas or rough terrains, commonly require an arm-wheel robotic vehicle with a wheel at one end of each leg or arm, respectively. When an arm-wheel robot encounters obstacles such as stairs, it can traverse them by raising its legs onto the stairs and driving and rotating its wheels. When an arm-wheel robotic vehicle travels over uneven ground, many shocks are relayed to its arm-wheels, and the shocks are absorbed by a suspension system.

FIG. 1 is a schematic perspective view of a suspension system 1 of a related art vehicle. The suspension system 1 is disposed on each wheel approximately vertically to the ground, and each suspension system 1 is altered by a length directly proportional to the amount of shock the vehicle is subjected to when traveling over uneven surfaces. The stability of the vehicle body is determined by the compression of each suspension system 1, and in order to maintain a leaning vehicle body in a horizontal state, a total of four suspension systems 1 must be controlled at different rates according to the leaning of the body. Such stability control, however, is not easy to accomplish with this suspension system 1 of the related art vehicle. Accordingly, when traveling on a sloped surface, the inclination of a vehicle body corresponds to the angle of the sloped surface, thereby destabilizing the vehicle body. Also, because a vertically disposed suspension system 1 is a structure that raises the vehicle body upwards from the bottom, the center of gravity of the vehicle body is raised, thereby also destabilizing the vehicle body.

SUMMARY

One or more of exemplary embodiments provide a suspension system and a vehicle including the same, with improved vehicle stability control performance and ability to absorb impacts to secure stability.

According to an aspect of an exemplary embodiment, there is provided a vehicle including: a body, at least one arm pivotally coupled to the body, a bottom unit coupled to one end of an arm of the at least one arm, and a suspension system. The suspension system may include a resilient member disposed to generate a counter moment in a direction which offsets an impact moment applied to the arm from the bottom unit by an external force exerted on the bottom unit, and a displacement variable actuator coupled to a first end of the resilient member and configured to displace the first end of the resilient member.

The suspension system may further include a pivot arm provided at a perimeter of a pivot axle supporting pivoting of the arm to rotate by a rotation angle of the arm, and a second end of the resilient member may be coupled to the pivot arm, and the resilient member may be configured to be displaced together with the pivot arm in accordance with angular displacement of the pivot arm.

The resilient member may be a coil spring. The resilient member may also be a hydro strut that employs fluid pressure and gas. The resilient member may also be a rotational spring. Further, the resilient member may be a magnetic reaction fluid damper that changes in viscosity through magnetic reaction.

The suspension system may be disposed such that a direction in which the counter moment is generated is substantially parallel to a length direction of the vehicle and a ground surface which the bottom unit contacts. The first end of the resilient member and the displacement variable actuator may be coupled to each other in a direction substantially parallel to the ground surface. Also, an axis of the direction in which the counter moment is generated and an axis of a direction in which the impact moment is applied to the arm may be substantially vertical to each other. More specifically, an angle formed by an axis of the direction in which the counter moment is generated and an axis of a direction in which the impact moment is applied to the arm may be less than 45°.

The suspension system may further include a damping member disposed within or connected to the resilient member.

The suspension system of the vehicle may further include a pivoting rigid body coupled to the pivot axle such that the pivoting rigid body and the arm are pivoted together, and the pivot arm may be fixed to the pivoting rigid body. The second end of the resilient member may be directly coupled to the pivot arm. Alternatively, the second end of the resilient member may be indirectly coupled to the pivot arm. For example, the second end of the resilient member may be coupled to the pivot arm through another rigid body.

In the vehicle, the bottom unit may be a wheel.

The vehicle may include another arm provided at a first side of the vehicle while the at least one arm is provided at a second side of the vehicle, wherein the arm and the other arm are provided on both sides pivot about a same axle.

The vehicle may include another suspension system, corresponding to the above suspension system, which is provided for the other arm. The two suspension systems may be controlled independently from one another The arm and the other arm may be provided on both sides pivot about mutually different pivot axles.

According to an aspect of another exemplary embodiment, there is provided a suspension system employed by a vehicle provided with at least one arm pivotally coupled to a body of the vehicle. The suspension system may be provided with a spring disposed to operate together with a pivot arm coupled to a pivot axle of one of the at least one arm, to generate a counter moment in a direction that offsets an impact moment applied to the arm.

The suspension system may include a resilient member disposed to generate a counter moment in a direction which offsets an impact moment applied to an arm among the at least one arm, and a displacement variable actuator coupled to a first end of the resilient member and configured to displace the first end of the resilient member.

The suspension system may further comprise a damping member disposed within or connected to the resilient member.

The displacement variable actuator may be controlled in a manner that the arm is pivoted in order to stabilize posture of the vehicle.

According to an aspect of an exemplary embodiment, there is provided an arm-wheel type robotic vehicle including: a robotic vehicle body, at least one arm pivotally coupled to the body, a bottom unit coupled to one end of an arm of the at least one arm, and a suspension system comprising a resilient member disposed to generate a counter moment in a direction which offsets an impact moment applied to the arm from the bottom unit by an external force exerted on the bottom unit; and a displacement variable actuator coupled to a first end of the resilient member and configured to displace the first end of the resilient member.

The suspension system of the arm-wheel type robotic vehicle may further include a pivot arm provided at a perimeter of a pivot axle supporting pivoting of the arm to rotate by a rotation angle of the arm. A second end of the resilient member may be coupled to the pivot arm, and the resilient member may be configured to be displaced together with the pivot arm in accordance with angular displacement of the pivot arm.

The second end of the resilient member may be directly or indirectly connected to the pivot arm.

The suspension system may be disposed such that a direction in which the counter moment is generated is substantially parallel to a length direction of the vehicle and a ground surface which the bottom unit contacts. The first end of the resilient member and the displacement variable actuator may be coupled to each other in a direction substantially parallel to the ground surface. Also, an axis of the direction in which the counter moment is generated and an axis of a direction in which the impact moment is applied to the arm may be substantially vertical to each other. More specifically, an angle formed by an axis of the direction in which the counter moment is generated and an axis of a direction in which the impact moment is applied to the arm may be less than 45°.

The suspension system of the arm-wheel type robotic vehicle may further include a pivoting rigid body coupled to the pivot axle such that the pivoting rigid body and the arm are pivoted together. The pivot arm may be fixed to the pivoting rigid body.

The arm-wheel type robotic vehicle may further include another arm provided at a first side of the vehicle while the at least one arm is provided at a second side of the vehicle. The arm and the other arm may be provided on both sides pivot about a same axle. Another suspension system corresponding to the suspension system may be provided for the other arm. These two suspension systems may be controlled independently from one another.

The arm and the other arm may also be provided on both sides pivot about mutually different pivot axles.

BRIEF DESCRIPTION OF THE DRAWINGS

The above and/or other aspects will become more apparent by describing in detail exemplary embodiments with reference to the accompanying drawings, in which.

DETAILED DESCRIPTION OF THE EXEMPLARY EMBODIMENTS

Exemplary embodiments will be described in detail below with reference to the attached drawings.

Figure 2:
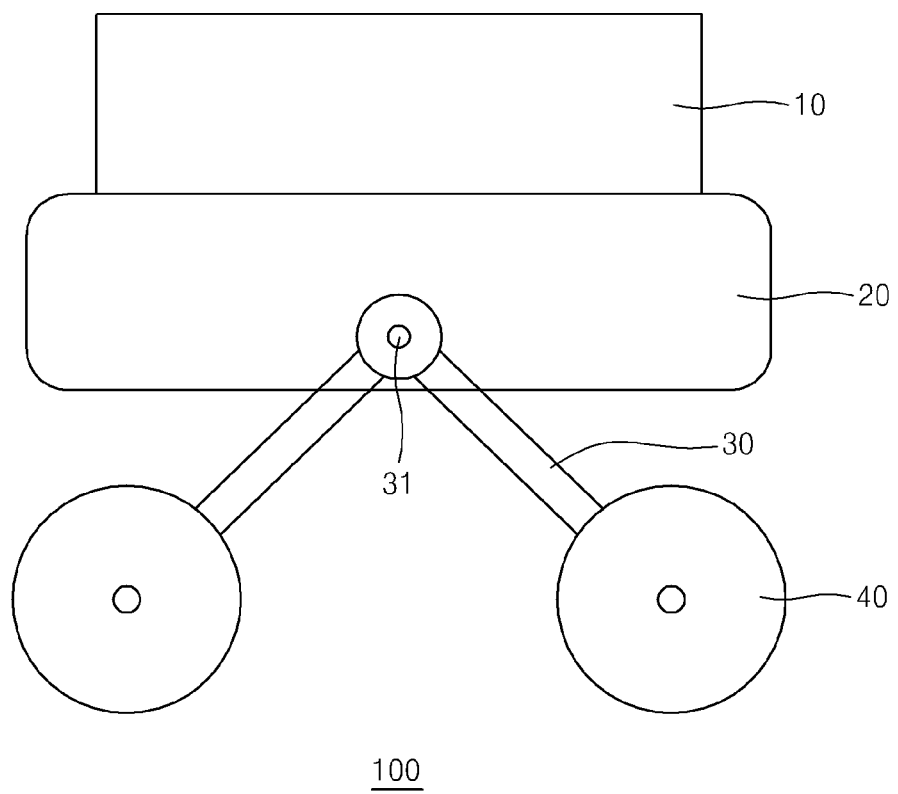
FIG. 2 is a schematic view of a robotic vehicle employing a suspension system according to an exemplary embodiment.

FIG. 2 is a schematic side view of a robotic vehicle 100 employing a suspension system, according to an exemplary embodiment. The robotic vehicle 100 is provided with a main body, an arm 30, and wheels 40. The main body may be formed of a body 20, and an assembly 10 mounted on the body 20. The body 20 is a frame that supports the assembly 10. Here, the body 20 is a portion that is horizontal overall with respect to a flat ground surface.

The robotic vehicle 100 has two arms 30 at the left side and right side, respectively. Each arm 30 has a wheel 40 mounted on one end thereof. The arm 30 with the wheel 40 mounted on one end thereof is pivotally controllable. The arms 30 on one side of the robotic vehicle 100 pivot about a common pivot axle 31. The arms (not shown) on the other side of the robotic vehicle 100 also pivot about a common pivot axle (not shown). Here, the pivot axle 31 that is the pivoting center of the arms 30 on one side of the robotic vehicle 100 does not necessarily have to be on the same axle with the pivot axle that is the pivoting center of the arms on the other side of the robotic vehicle 100.

Figure 3:
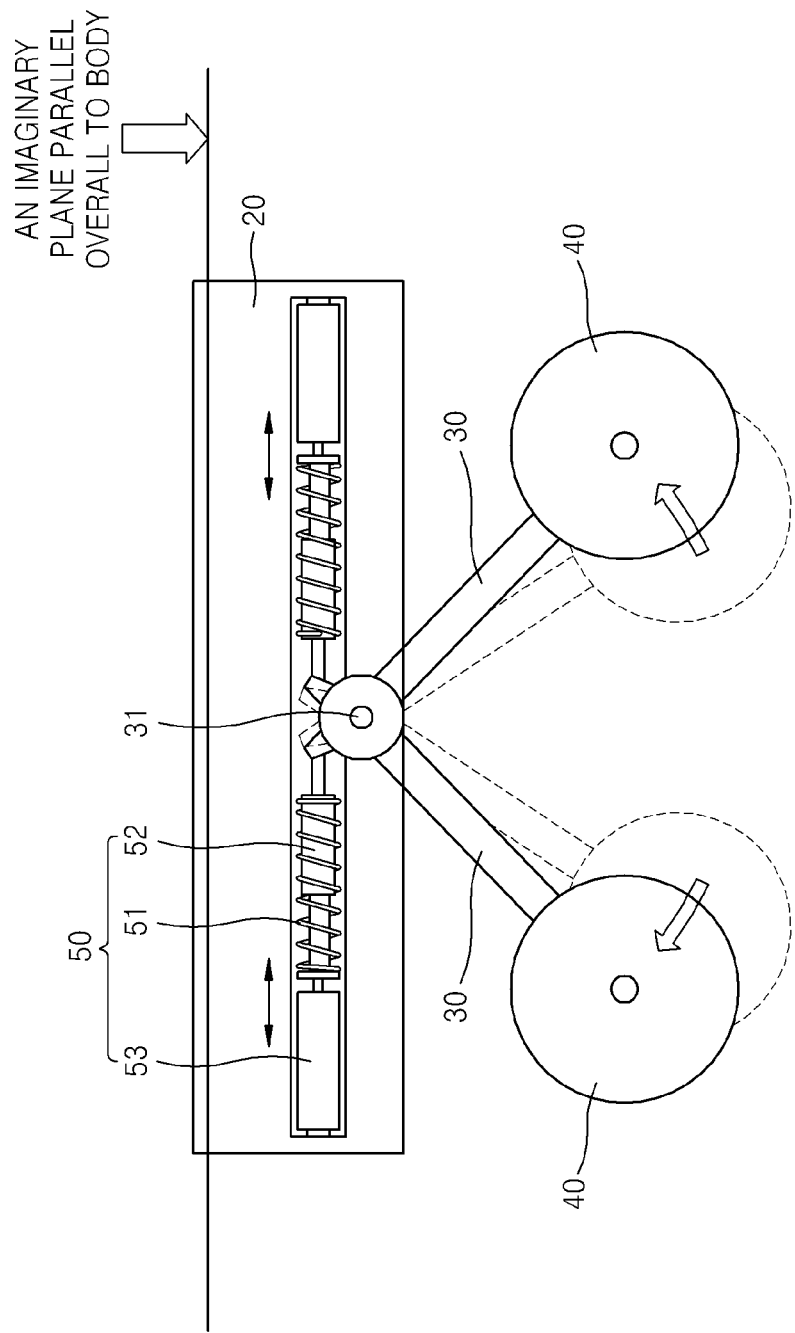
FIG. 3 is a view schematically illustrating a suspension system according to an exemplary embodiment.
Figure 4:
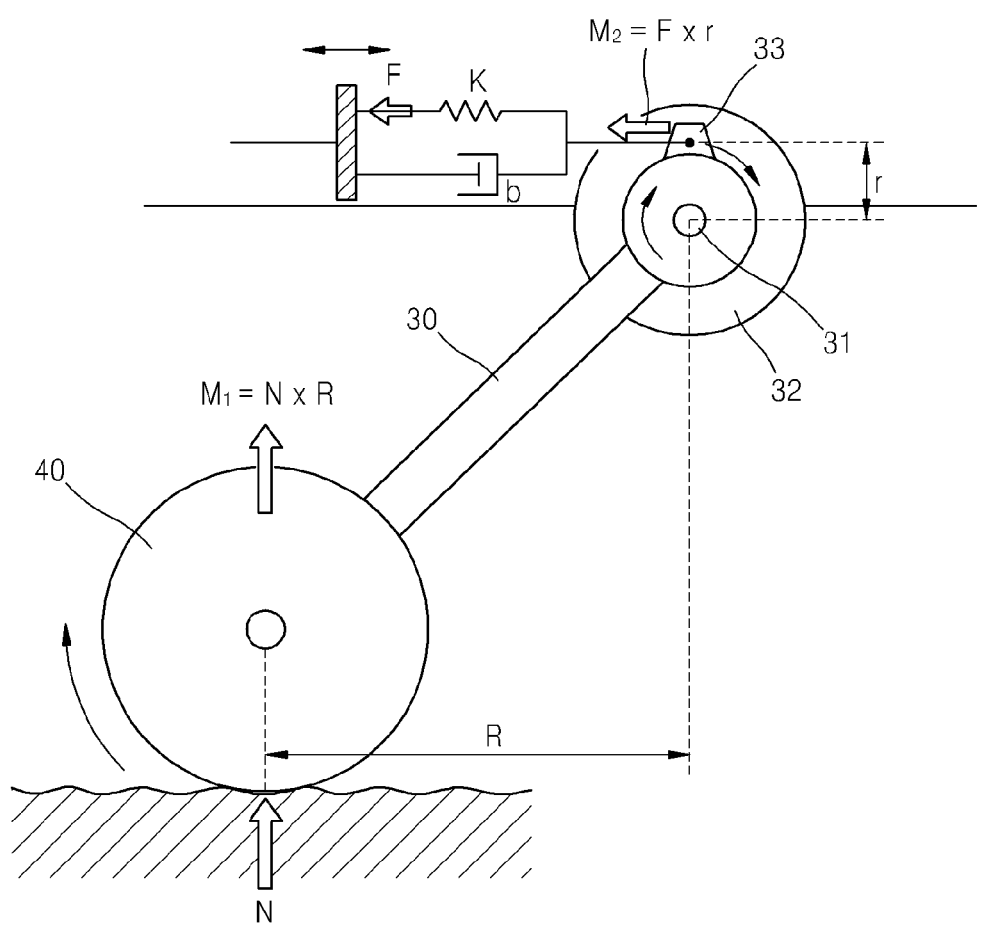
FIG. 4 is a schematic view illustrating operational principles of the suspension system in FIG. 3, according to an exemplary embodiment.

FIGS. 3 and 4 are views schematically illustrating a suspension system according to an exemplary embodiment, and the operational principles thereof.

A wheel 40 is rotatably connected to a first end of an arm 30, and a second end of the arm 30 is pivotally connected to a pivot axle 31. A pivoting rigid body 32 is pivotally mounted to the pivot axle 31. The pivoting rigid body 32 shares the pivot axle 31 with the arm 30 and pivots by as much as a pivoting angle of the arm 30. A pivot arm 33 is fixed to a portion on the outer periphery of the pivoting rigid body 32. Thus, the pivot arm 33 is also pivoted by as much as the pivoting angle of the arm 30.

Figure 7:
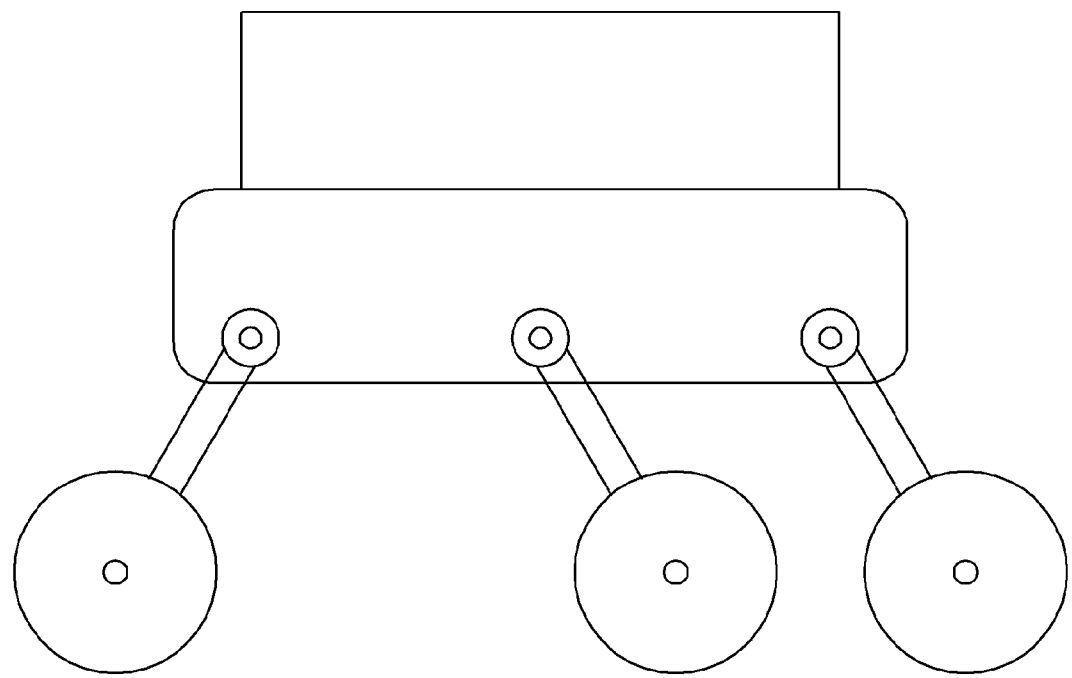
FIG. 7 is a schematic view of a robotic vehicle employing a suspension system according to another exemplary embodiment.

As a modified example, the pivot arm 33 may be formed fixed directly to the second end of the arm 30, so that the pivot arm 33 is pivoted by as much as a pivoting angle of the arm 30. In particular, as shown in FIG. 7, this modified example may be easily applied to a robotic vehicle 200 with two arms 30 at one side of the robotic vehicle 200 that pivot about different pivot axles 31.

A suspension system 50 may include a resilient member such as a coil spring 51. The suspension system 50 is configured to generate an opposite moment in a direction that absorbs an impact moment generated upon pivoting of the arm 30. The resilient member may be a hydro strut that employs fluid pressure and gas, or a rotational spring. Further, the resilient member may be a magnetic reaction fluid damper that changes in viscosity through a magnetic reaction.

According to an exemplary embodiment, the suspension system 50 includes the coil spring 51, a damper 52, and a displacement variable actuator 53. One end of the coil spring 51 and one end of the damper 52 may be fixedly mounted to the pivot arm 33. That is, the one end of the coil spring 51 and the one end of the damper 52 move together according to movement of the pivot arm 33. Conversely, one end of the coil spring 51 and one end of the damper 52 may first be connected to another rigid body (not shown), which may subsequently be connected to the pivot arm 33.

The opposite end of the coil spring 51 and the opposite end of the damper 52 are fixedly mounted to the displacement variable actuator 53. The opposite end of the damper 52 may be fixedly connected to the displacement variable actuator 53 through a connection member. The suspension system 50 is disposed to be approximately parallel to the body 20. As shown in FIG. 4, the wheel 40 receives shocks from a ground surface or obstacles due to the weight of the robotic vehicle 100, and therefore, an impact moment $M_1$ imparted clockwise on the wheel 40 is determined according to Equation 1 below.

$$M_1 = N \times R \qquad \text{[Equation 1]}$$

Here, N represents an external force imparted vertically, and R represents a horizontal distance from the center of the pivot axle 31 to the center of the wheel 40.

When the arm 30 rotates in a clockwise direction, the pivot arm 33 also rotates clockwise. The displacement of the displacement variable actuator 53 is in a fixed state, and the coil spring 51 and the damper 52 expand. Because the coil spring 51 expands from a state of equilibrium, a resilient force F of the coil spring 51 which tends to resume its original state acts upon the pivot arm 33 with a counter-clockwise rotational force. An opposite moment $M_2$ restoring force of the coil spring 51 that imparts a counter-clockwise force on the pivot arm 33 is determined according to Equation 2 below.

$$M_2 = F \times r \qquad \text{[Equation 2]}$$

Here, F represents the resilient force of the coil spring 51 for returning to a state of equilibrium, and r represents a vertical distance from the center of the pivot axle 31 to the portion of the pivot arm 33 to which the coil spring 51 is fixed.

Because the resilient force F of the coil spring 51 is generated proportionally to the pivoting angle of the pivot arm 33 corresponding to the pivoting angle of the arm 30, the opposite moment is generated in an amount that can absorb the impact moment. Due to this moment equalizing principle, the impact incurred on the wheel 40 is absorbed by the coil spring 51 and is transmitted through the resilient force. That is, the following Equation 3 is made possible.

$$N \times R = F \times r \qquad \text{[Equation 3]}$$

This suspension system 50 may be disposed to be substantially horizontal with the main body of the robotic vehicle 100, and particularly the body 20. Here, the phrase "substantially horizontal" does not mean a strictly or absolutely horizontal state, but means that if there is an imaginary plane that is parallel-planar overall to the body 20 and a vertical plane as well, then the suspension system 50 is disposed at a slant that is closer to the horizontal imaginary plane than the vertical plane. That is, the suspension system 50 forms an angle with an imaginary plane parallel with the body 20 that is within a range of less than 45°, which falls within the scope of the present inventive concept.

Figure 1:
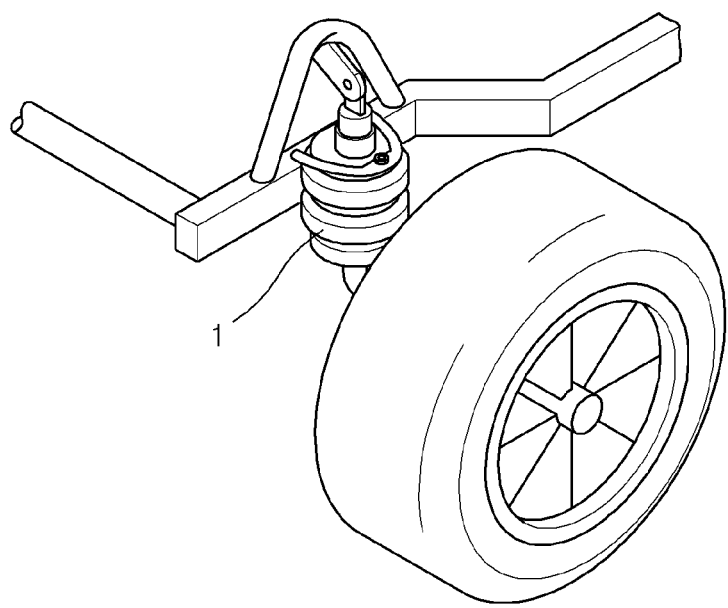
FIG. 1 is a schematic perspective view of a suspension system of a related art.

By making a structure in which the suspension system 50 is disposed approximately horizontal with respect to the body 20, the effects obtainable when compared to the suspension system 1 of the related art shown in FIG. 1 are as follows.

First, the suspension system 50 as shown in FIG. 3 is favorable in terms of body stability. With the suspension system 1 of the related art, because the vertically disposed suspension system 1 is attached to the body, the body's center of gravity is necessarily elevated by a certain height due to the physical length of the suspension system 1. Thus, stability is compromised. On the other hand, because the suspension system 50 is disposed horizontally with the body 20, the suspension system 50 does not raise the height of the body 20, and can lower the center of gravity to improve body stability.

Also, the suspension system 50 has its components inside the body 20 that is mostly arranged horizontally, so that a space may be secured for positioning other components that are needed to manufacture the body.

In addition, with the suspension system 50, stability control of the body is advantageous. With the suspension system 1 of the related art, when traversing an area with a sloped surface or uneven ground, due to the vertically positioned suspension system 1 having a minimum length, there are limits to the range in which the disposition of the body 20 can be altered, and it is not easy to alter the disposition. However, because the suspension system 50 is disposed horizontally, there are few restrictions on the range in which the body disposition can be altered. Particularly with sloped surfaces, the pitching angle parameters of the body 20 can be increased to allow greater angular alterations to body disposition, and thus improve the stability control function.

The displacement variable actuator 53 coupled to the opposite end of the coil spring 51 may be controlled in displacement horizontally. That is, when the displacement variable actuator 53 is displaced toward the pivot axle 31, the distance between the opposite end and the first end of the coil spring 51 is shortened, and conversely, when the displacement variable actuator 53 is displaced away from the pivot axle 31, the distance between the opposite end and the first end of the coil spring 51 is lengthened. Assuming that the resilient force at the coil spring 51 is constant, the displacement of the coil spring 51 and the elastic coefficient have an inversely proportional relationship. That is, when the distance between the opposite end and the first end of the coil spring 51 is reduced, the elastic coefficient must be greater to produce the same resilient force. This can be achieved by coupling the displacement variable actuator 53 to the opposite end of the coil spring 51 to adjust the distance between the opposite end and the first end of the coil spring 51 and alter the elastic coefficient of the coil spring 51. Thus, with the difference in elastic coefficient, controlling performance—i.e., changes in the amount of overshoot, the time required to reach a normal state, the margin of error, etc. can be reduced, so that designs can be made tailored for users in diverse mobile environments.

The coil spring 51 is displaced in accordance with displacement of the displacement variable actuator 53 which is coupled to the other end of the coil spring 51. Then, the pivot arm 33 which is coupled to one end of the coil spring 51 is angularly displaced and accordingly posture of the robotic vehicle 100 changes. In other words, the posture of the robotic vehicle 100 can be controlled for better stability by actuating the displacement variable actuator 53. As such, the posture control by means of the displacement variable actuator 53 allows the robotic vehicle 100 to pass through obstacles with less difficulty and travel stably even under abnormal road condition, such as a steep or uneven terrace.

Figure 5:
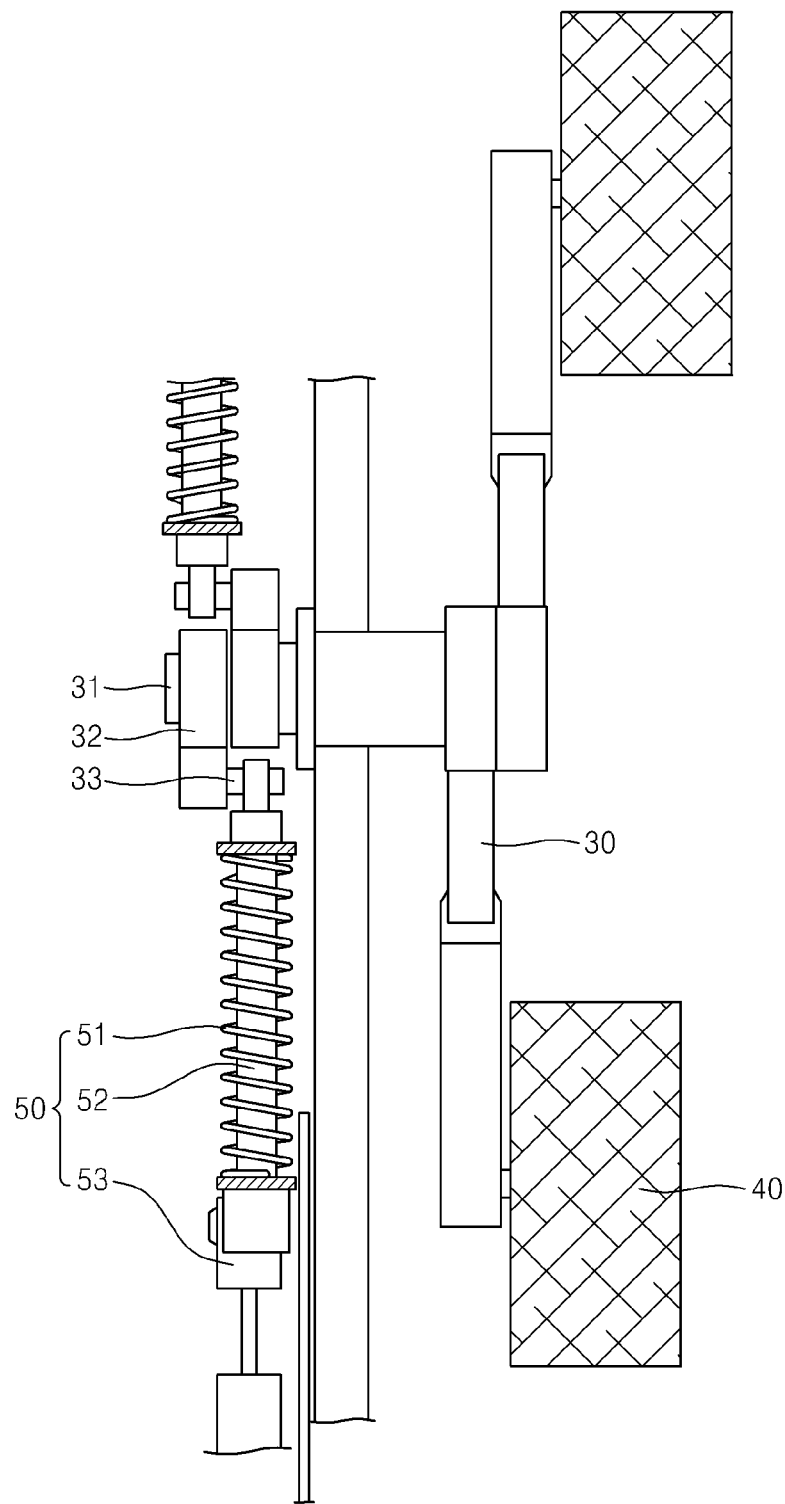
FIG. 5 is a schematic plan view of a suspension system according to an exemplary embodiment.
Figure 6:
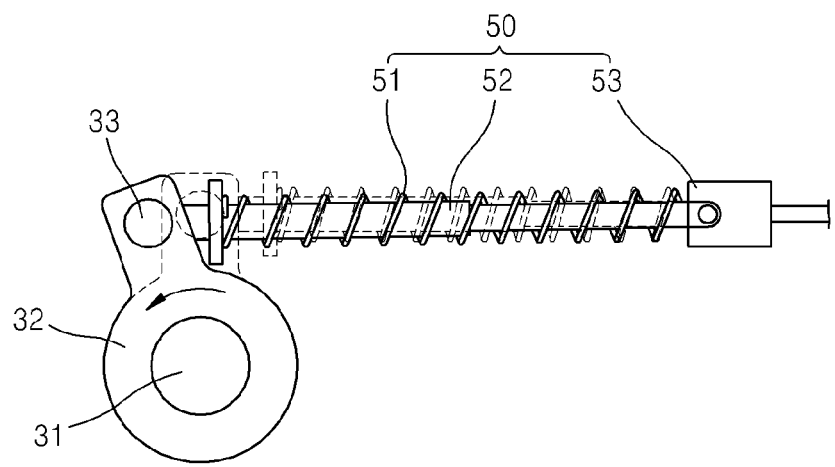
FIG. 6 is a view schematically illustrating the operation of a suspension system when a wheel arm and a pivot axle are rotated, according to an exemplary embodiment.

Referring to FIG. 5, two arms 30 pivot about the same pivot axle 31. For example, in the diagram, when an impact is directed to the wheel 40 and the arm is pivoted, the pivoting rigid body 32 is pivoted together in a counter-clockwise direction to expand the length of the coil spring 51 connected to the pivot arm 33, as shown in FIG. 6. The expanded coil spring 51 generates a resilient force F tending to resume its original state and exerts a force to rotate the pivoting rigid body 32 in a clockwise direction to absorb shock.

Exemplary embodiments are possible in which the suspension system 50 does not include a separate damper 52. The damper 52 may be a hydraulic damper. The damper 52 performs shock absorption. If a damper 52 is added, the time that it takes for the wheel 40 and arm 30 to stabilize to normal after the wheel 40 is subjected to an impact can be reduced, and the amount of vibrations can be reduced.

The suspension system 50 according to the exemplary embodiments described above may also be applied to an arm wheel of a robotic vehicle 200 shown in FIG. 7. In this exemplary embodiment, the arms 30 pivot respectively about a pivot axle 31 at one side of the robotic vehicle, and the arms 30 do not share the pivot axle 31. Therefore, only one pivot arm 33 is connected to one pivot axle 31.

Figure 8:
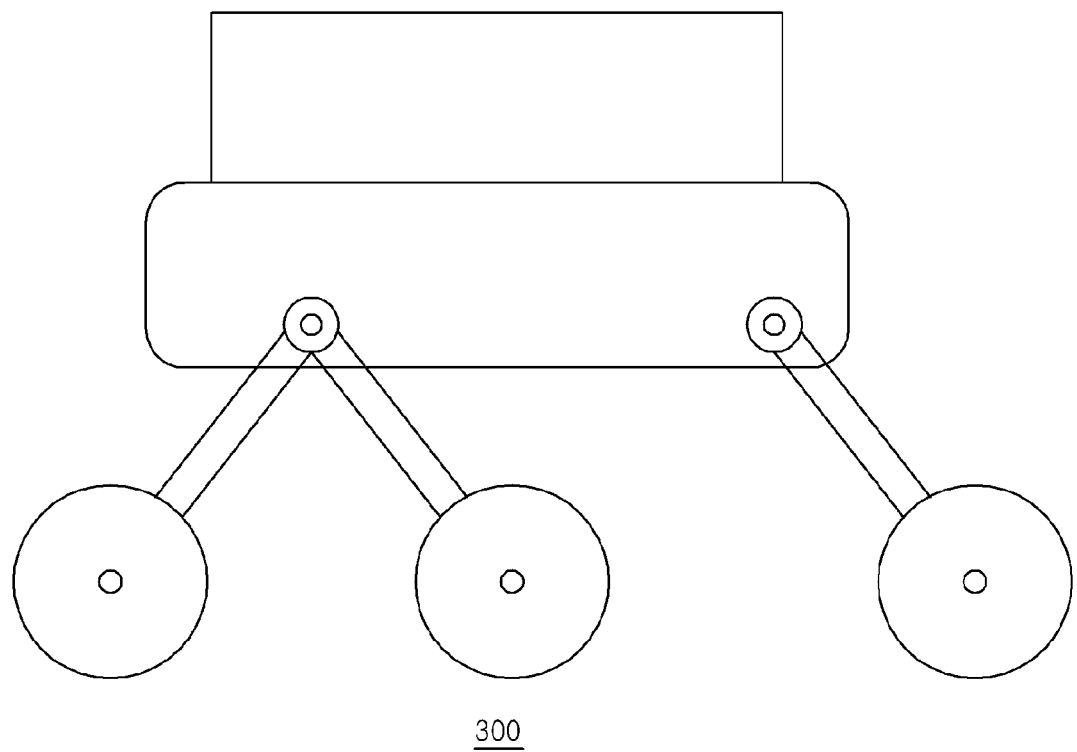
FIG. 8 is a schematic view of a robotic vehicle employing a suspension system according to another exemplary embodiment.

Similarly, the suspension system 50 described in the exemplary embodiments above may also be applied to an arm-wheel of a robotic vehicle 300 shown in FIG. 8.

While the inventive concept has been particularly shown and described with reference to exemplary embodiments thereof, it will be understood by those having ordinary skill in the art that various modifications and equivalent exemplary embodiments may be devised. Therefore, the actual technical protective scope of the inventive concept shall be interpreted based on the technical spirit and scope of the following claims.

What is claimed is:

1. A vehicle comprising:
   a body;
   at least two arms which are pivotally coupled to the body through a common pivot axle;
   a bottom unit which is coupled to one end of each arm of the at least two arms; and
   a suspension system connected to each arm and comprising:
      a resilient member which is disposed to generate a counter moment in a direction which offsets an impact moment applied to each arm from the bottom unit by an external force exerted on the bottom unit; and
      a displacement variable actuator which is coupled to a first end of the resilient member and configured to displace the first end of the resilient member,
   wherein the first end of the resilient member and the displacement variable actuator are coupled to each other to be displaced only in a direction substantially parallel to a ground surface which the bottom unit contacts.

2. The vehicle of claim 1, wherein the suspension system further comprises a pivot arm provided on an outer perimeter of the common pivot axle,
   wherein the common pivot axle comprises a pivoting center for each arm to rotate with respect to the pivoting center by a rotation angle of each arm, and
   wherein a second end of the resilient member is coupled to the pivot arm, and the resilient member is configured to be displaced together with the pivot arm in accordance with the rotation angle of each arm.

3. The vehicle of claim 1, wherein a second end of the resilient member is directly or indirectly connected to a pivot arm.

4. The vehicle of claim 1, wherein the suspension system is disposed to form an angle less than 45° with an imaginary plane parallel to the body of the vehicle.

5. The vehicle of claim 1, wherein the suspension system further comprises a pivoting rigid body which is coupled to the common pivot axle such that the pivoting rigid body and each arm are pivoted together,
   wherein a pivot arm is fixed to the pivoting rigid body.

6. The vehicle of claim 1, wherein the bottom unit is a wheel.

7. The vehicle of claim 1, wherein the resilient member is at least one of a coil spring, a hydro strut, a rotational spring, and a magnetic reaction fluid damper.

8. The vehicle of claim 1, wherein the resilient member is configured to generate a resilient force only in the direction substantially parallel to the ground surface.

9. The vehicle of claim 1, wherein the suspension system is provided inside the body.

* * * * *